United States Patent [19]
Trimble

[11] Patent Number: 5,918,668
[45] Date of Patent: Jul. 6, 1999

[54] SYSTEM FOR INCREASING THE TEMPERATURE OF AIR INITIALLY DELIVERED BY A HEAT PUMP

[76] Inventor: Andrew M. Trimble, 13031 Bottom Rd., Hydes, Md. 21082

[21] Appl. No.: 09/028,494

[22] Filed: Feb. 24, 1998

[51] Int. Cl.⁶ .......................... F25B 29/00; G05D 23/00
[52] U.S. Cl. ...................... 165/240; 165/242; 165/288; 237/28
[58] Field of Search .................................. 165/240, 242, 165/288, 291; 237/2 B

[56] References Cited

U.S. PATENT DOCUMENTS

| | | | |
|---|---|---|---|
| 4,265,299 | 5/1981 | Harnish | 165/240 |
| 4,293,029 | 10/1981 | Godard et al. | 165/240 |
| 4,420,034 | 12/1983 | VanderVaart | 165/240 |
| 4,598,764 | 7/1986 | Beckey | 165/242 |
| 4,840,220 | 6/1989 | Umezu et al. | 165/240 X |
| 4,852,360 | 8/1989 | Harshbarger, Jr. et al. | 165/242 X |
| 5,259,445 | 11/1993 | Pratt et al. | 165/242 X |
| 5,332,028 | 7/1994 | Marris | 165/240 X |
| 5,488,218 | 1/1996 | Olsen et al. | 165/240 X |

Primary Examiner—Ira S. Lazarus
Assistant Examiner—Lance Chandler
Attorney, Agent, or Firm—Rosenberg, Klein & Bilker

[57] ABSTRACT

A system (10) for increasing the temperature of air initially delivered by an existing heat pump system (100) is provided which may be easily added to the existing heat pump system. System (10) includes a heat pump comfort controller (12) having a plurality of control signal leads (14, 16, 18 and 20) which are coupled in parallel relationship with a respective plurality of control signal leads (114, 116, 118 and 120) of heat pump system (100) interconnecting the heat pump indoor unit (110) with the heat pump outdoor unit (112). Heat pump comfort controller (12) includes a thermostat (50) for sensing the outdoor ambient air temperature and includes a contact (52) that closes when the outdoor ambient temperature falls below a predetermined value, conducting a control signal from the lead (14) for signaling the energization of supplemental heating units (132) of heat pump system (100). System (10) also includes a duct thermostat (62) which senses the temperature of the main supply air duct (130) of heat pump system (100) for de-energizing the supplemental heating units when the main supply air duct temperature reaches a predetermined value.

20 Claims, 2 Drawing Sheets

SYSTEM FOR INCREASING THE TEMPERATURE OF AIR INITIALLY DELIVERED BY A HEAT PUMP

BACKGROUND OF THE INVENTION

1. Field of the Invention

This invention is directed to a system for modifying the operation of a heat pump system to increase the temperature of air initially delivered thereby. In particular, this invention is directed to a system for increasing the temperature of air initially delivered by an existing heat pump system in a heating mode by adding supplemental heat responsive to operation of controller and duct thermostat interfaced with the heat pump system. More in particular, the controller of the present invention includes a thermostat for sensing outdoor ambient temperature for output of a control signal to energize supplemental heating units of the heat pump system when the ambient air temperature is below a predetermined value. Still further, the system of the present invention includes a duct thermostat which monitors the temperature of the main supply air duct for cutting off the addition of supplemental heat when the air duct temperature reaches a predetermined value.

2. Prior Art

Over the years, heat pump systems have gained great acceptance due to their high efficiency operation in moderate climates. However, as the outdoor ambient temperature approaches freezing, the efficiency of heat pump systems is reduced. Effects such as lubricant migration and reduced heat transfer that occur when the outdoor ambient temperature is low cause the compressor to operate for longer periods of time in order to meet the heating demands being called for by the indoor thermostat. Such heat pump systems add supplemental heat, usually from a source such as one or more stages of electric resistance heating units, when the differential between the indoor ambient temperature and the temperature called for by the thermostat exceeds a predetermined value, usually 2.5° F. During the time period when the compressor is first energized and until the temperature differential reaches the point at which the supplemental heating units are energized, relatively cool air is displaced by the air handler of the heat pump system. This circulation of relatively cool air has brought about the majority of consumer complaints with respect to heat pump operation.

In an attempt to remedy that problem, some systems have been sold which add supplemental heat to raise the temperature of the air exiting the supply air ducts. Such systems, however, add supplemental heat whenever the heating mode is being utilized, irrespective of the outdoor ambient temperature. Thus, such systems are inefficient in that they add heat when such addition is not necessary, thereby significantly increasing the cost of operation of the heat pump system. Whereas in the instant invention, the addition of supplemental heat is only initiated when the outdoor ambient temperature falls below a predetermined value. Further, a lockout mechanism is provided for preventing the addition of such supplemental heat when the heat pump system is not in a heating mode.

SUMMARY OF THE INVENTION

A system for modifying the operation of a heat pump system operating in a heating mode to initiate operation of a supplemental heating stage responsive to a sensed outdoor ambient temperature is provided. The operation modification system includes a duct thermostat located in a position for sensing a temperature of a supply air duct extending from an indoor unit of a heat pump system. The duct thermostat has a normally closed contact coupled between a pair of terminals and opened when the sensed supply duct temperature rises above a first predetermined temperature. The terminals of the duct thermostat are coupled in series relationship with a supplemental heating stage control signal lead of a plurality of first control signal leads coupled between the indoor unit and an outdoor unit of the heat pump system. The operation modification system also includes a control assembly having a plurality of second control signal leads coupled respectively in parallel relation with the plurality of first signal leads for output of an energization signal to the supplemental heating stage control signal lead to cause the supplemental heating stage to add heat to the supply air duct until a temperature in the supply air duct exceeds the first predetermined temperature wherein the contact of the duct thermostat opens. The control assembly includes an ambient sensing thermostat located in a position for sensing an outdoor ambient temperature. The ambient sensing thermostat has a normally closed contact coupled in series with the output of the energization signal. The normally closed contact of the ambient sensing thermostat opens when the sensed temperature is above a second predetermined temperature.

DESCRIPTION OF THE PREFERRED EMBODIMENT

Figure 1:
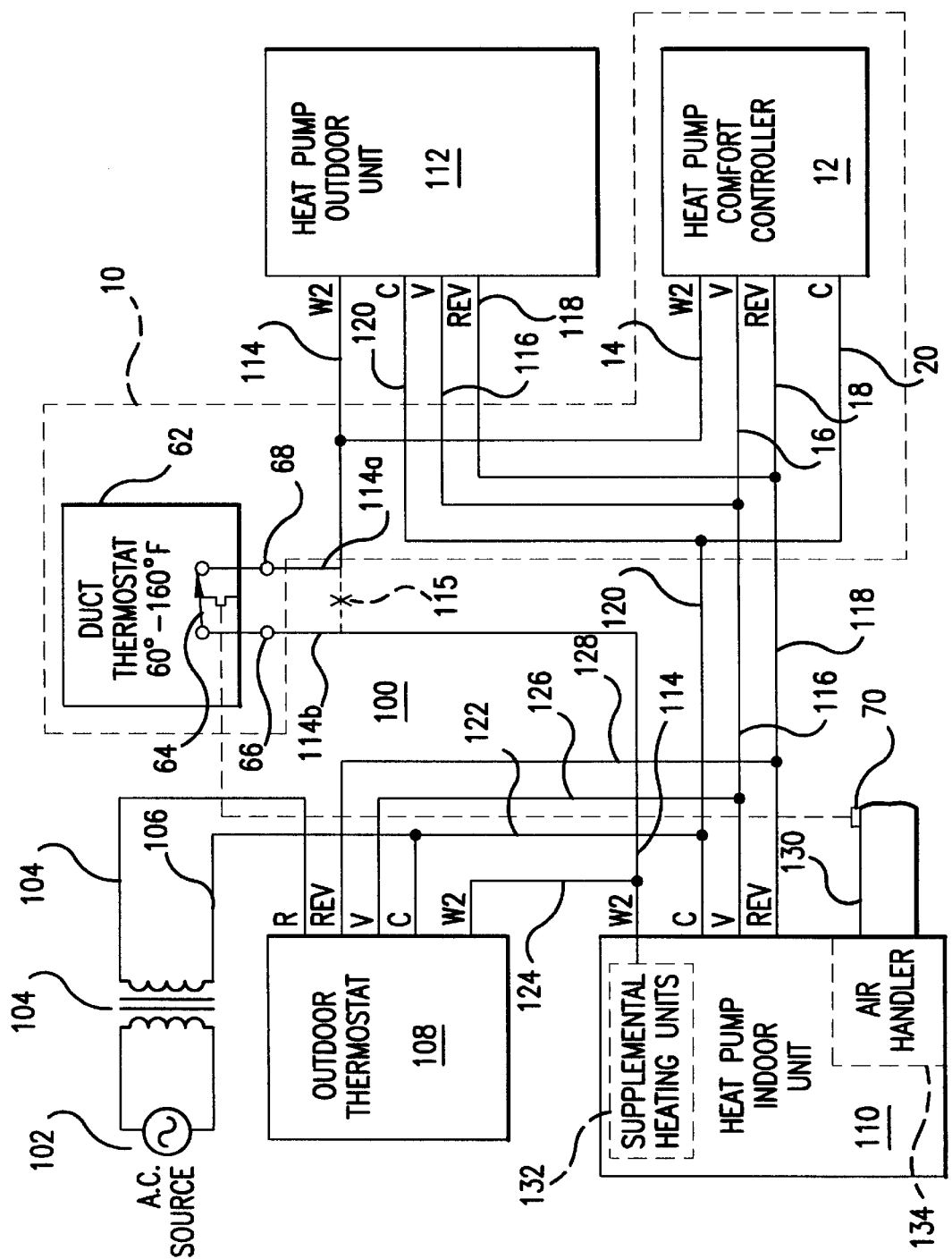
FIG. 1 is a schematic diagram of the present invention installed in an existing heat pump system; and, FIG. 2 is a schematic diagram of the controller of the present invention.
Figure 2:
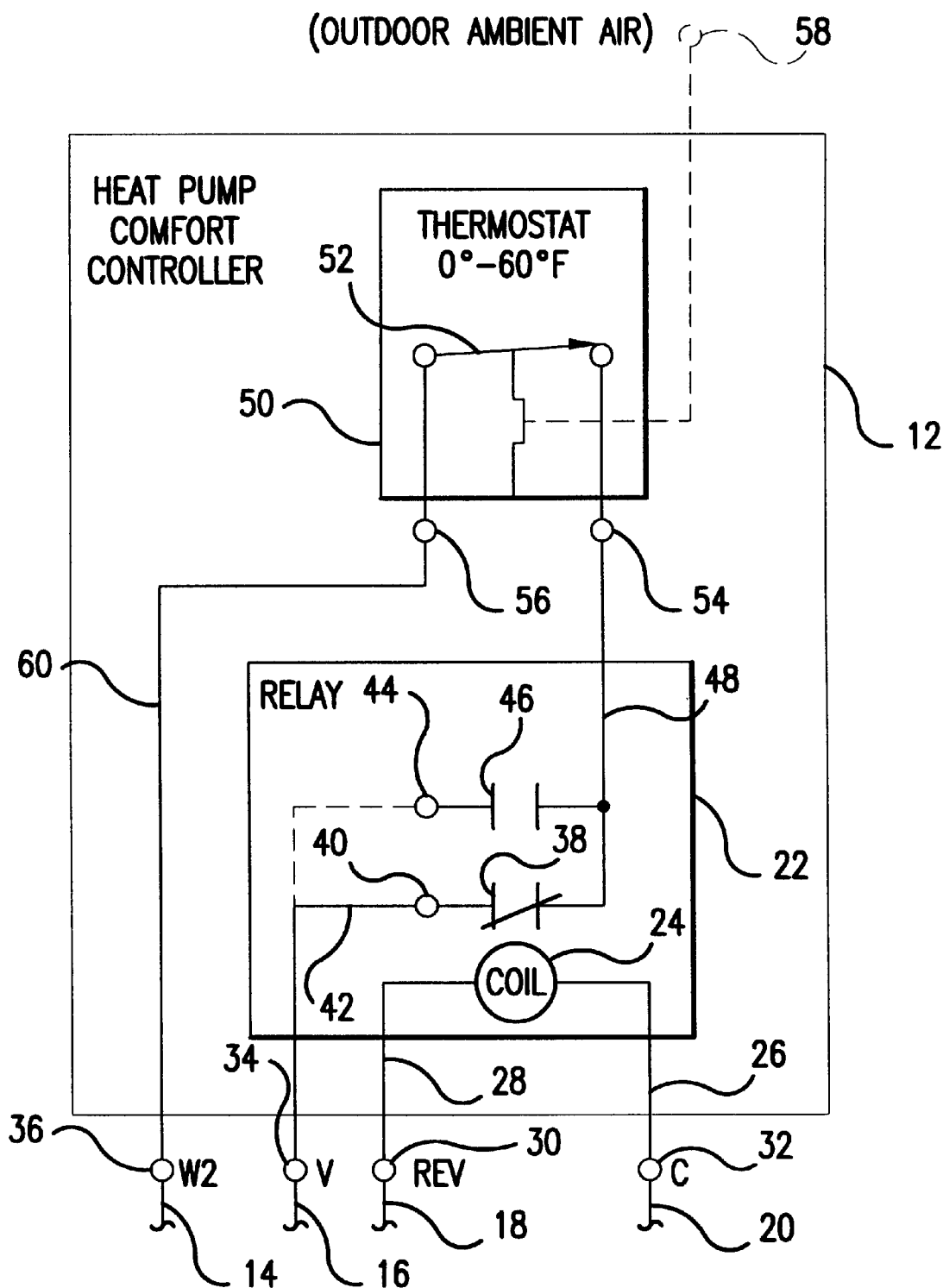

Referring now to FIGS. 1 and 2, there is shown system 10 for increasing the temperature of air initially delivered by an existent heat pump system 100. System 10 is easily connected to an existing heat pump system 100 to utilize the supplemental heating units 132 of at least a single supplemental heating stage of the heat pump system 100 for adding heat to the air initially delivered by the indoor unit 110 of heat pump system 100. The installation of system 10 does not interfere with the normal heating and cooling modes of the heat pump system 100, and may only minimally affect the operation of system 100 when the outdoor unit 112 is in a defrost cycle. As will be discussed in following paragraphs, system 10 outputs a control signal for energizing the supplemental heating units 132 whenever the outdoor ambient temperature is below a predetermined temperature. The supplemental heating units 132 remain energized until the air passing through the main supply air duct 130 rises sufficiently to cause a duct thermostat 62 to open.

Within certain temperature ranges, the heating mode of a heat pump can be operated at an efficiency which is significantly greater than other sources of heat. However, as the temperature of the outside ambient air decreases, this colder outside air temperature detrimentally affects the efficiency of the heat pump compressor. When the heat pump compressor is not operating, the lubricant in the closed system migrates away from the compressor, causing a decrease in the compression for the compressor during its start-up. Further, the reduced outdoor ambient temperature provides a smaller temperature differential between the outdoor heat exchanger and the ambient air, providing a reduced rate of heat transfer. As a result of the reduced efficiency caused by the aforesaid effects, the heat pump must operate for a longer period of time in order to satisfy the heating demand established by the indoor thermostat 108.

In most systems, it is not until the indoor temperature falls more than 2.5° below the thermostat set point that a supplemental heating stage is brought on line to provide additional heating capacity. However, during the period of time that only the compressor was the heat source, relatively cool air was circulated by the air handler 134 of indoor unit 110 of heat pump system 100. By the addition of system 10 to heat pump system 100, at least one stage of the supplemental heating units 132 are energized initially when heat is called for by the indoor thermostat 108, allowing the heat pump's compressor and supplemental heating units to operate in tandem until the main supply air duct temperature reaches a predetermined temperature selected to insure that warm air is circulated by heat pump system 100, thereby assuring the comfort of the homeowner.

Heat pump system 100 is an existing system installed in a residential or commercial building. The heat pump includes an outdoor unit 112 which typically houses a compressor and heat exchanger. Interior to the building, there is located a heat pump indoor unit 110 which has one or more stages of supplemental heating units 132 and an air handler 134 which circulates the heated or cooled air through a main supply air duct 130 to an air distribution system within the building. The operation of heat pump system 100 is controlled by an indoor thermostat 108, thermostat 108 is set for the desired indoor temperature, and includes the appropriate switches for placing the heat pump in the heating and cooling modes.

The control devices within the heat pump outdoor unit 112, the heat pump indoor unit 110 and the indoor thermostat 108 itself are powered from a low voltage power supply in the form of transformer 104. Transformer 104 includes a primary winding coupled to the AC source 102 and provides a low voltage output from the secondary winding thereof, typically 24 volts. The low voltage supplied by the secondary winding of transformer 104 is coupled to the voltage (R) and common (C) terminals of the indoor thermostat through leads 104 and 106, respectively. The low voltage is supplied to the V (compressor control signal) and C (power supply common) terminals of the heat pump indoor unit 110 through leads 126 and 122, respectively, as a function of switch closures in indoor thermostat 108. A plurality of control signal leads 114, 116, 118 and 120 extend between the heat pump indoor unit 110 and the heat pump outdoor unit 112, with the leads 116 and 120 being coupled between the respective V and C terminals for coupling the low voltage power to outdoor unit 112.

The control signal lead 114 that extends between the heat pump outdoor unit 112 and the heat pump indoor unit 110 carries a control signal utilized for controlling the energization of the supplemental heating units 132 located in the heat pump indoor unit 110. In normal operation, when the outdoor unit 112 goes into a defrost mode, a signal is output on lead 114 to cause the supplemental heating unit 132 to be energized for supplying the heat called for by the indoor thermostat 108. On the other hand, when the indoor thermostat calls for supplemental heat to be added in addition to the heat supplied for operation of the compressor, a control signal is output on the lead 124 which is coupled to the supplemental heating unit control signal terminal ($W_2$) of indoor unit 110, in parallel with the lead 114.

The lead 118 carries a control signal which is utilized to operate a reversing valve in the outdoor unit 112. The reversing valve controls the mode, heating or cooling, of the heat pump system, and in the heating mode, is switched to provide the defrost cycle. The indoor thermostat 108 provides a control signal output to control the reversing valve on lead 128, which is coupled in parallel with the reversing valve control terminals (REV) of the indoor unit 110 and outdoor unit 112, with the lead 128 being coupled to lead 118. To the conventional heat pump system 100, system 10 can be easily added for increasing the temperature of air initially delivered by the heat pump, with a minimal impact on heat pump system 100 itself.

A duct thermostat 62 is mounted in proximity to the heat pump indoor unit 110, wherein the thermal sensor 70 of duct thermostat 62 is positioned on the external surface of the main supply air duct 130, at a distance which is at least two feet from the indoor unit air handler 134. Duct thermostat 62 may have the thermal sensor 70 integrated into the housing thereof. In such circumstances, duct thermostat 62 would be mounted directly to the external surface of main supply air duct 130 at a location that is at least two feet from the air handler 134. Duct thermostat 62 includes a normally closed contact 64 which provides electrical coupling between the terminals 66 and 68. Contact 64 opens on a rise in temperature above a predetermined set point, which may be a fixed temperature that is factory set, or preferably, thermostat 62 is an adjustable type wherein the user can select the set point temperature. Preferably, the duct thermostat having an operable range within the span of 60°–160° F.

Duct thermostat 62 sets the temperature at which the initial supplemental heating is turned off and therefore should be set sufficiently high to allow warm air to be circulated without significantly increasing the operating costs of heat pump system 100. Ideally, the set point temperature should be set somewhere in the range of 90°–100° F., with 95° being a particularly desirable set point temperature. Although higher set point temperatures allow warmer air to be circulated and may increase the comfort level for the user, such may significantly increase the operating costs of heat pump system 100. Duct thermostat 62 is electrically coupled to heat pump system 100 by severing the supplemental heating control signal lead 114 at a location 115 disposed between the indoor unit 110 and the outdoor unit 112. As duct thermostat 62 is to be located in relatively close proximity to the indoor unit 110, the location 115 will likewise be located in close proximity to indoor unit 110. Each of the severed ends 114a and 114b are then electrically coupled to the duct thermostat terminals 68 and 66, respectively.

The heat pump comfort controller 12 of system 10 is located in relatively close proximity to the heat pump outdoor unit 112, as controller 12 must be coupled to the plurality of control signal leads 114, 116, 118 and 120 extending between the outdoor unit 112 and indoor unit 110, and includes a thermal sensor for sensing outdoor ambient air, and therefore is most conveniently located in the vicinity of outdoor unit 112. Heat pump comfort controller 12 includes a plurality of control signal leads 14, 16, 18 and 20 for respective coupling to control signal leads 114, 116, 118 and 120 of heat pump system 100. The control signal leads 16 and 20 provide the connection to the low voltage power supply, providing the connection to the V and C terminals. Lead 18 connects to the reversing valve control signal terminal for sensing the condition thereof. Heat pump comfort controller 12 provides an output control signal for initiating the energization of the supplemental heating units through the lead 14 which connects to the $W_2$ terminal of the heat pump outdoor unit 112 and the lead 114.

Thus, when the control signal for energizing the supplemental heating units is output from the heat pump comfort controller 12, such is coupled through the duct thermostat 62 to the supplemental heating units 132 of the indoor unit 110.

As will be described in following paragraphs, when the outdoor ambient temperature is below a predetermined set point temperature, and the signal supplied on lead 118 to the outdoor unit 112 indicates that the heat pump is being operated in a heating mode, heat pump comfort controller 12 outputs a control signal on lead 14 for controlling the energization of the supplemental heating units 132. As that sequence of events occurs upon initiation of a heating cycle, the duct thermostat 62 will sense a temperature below its set point, and the contact 64 will therefore be closed. Heat pump system 100 will operate with both the compressor and the supplemental heating units being operated together to supply heated air to the air handler 134, the air handler 134 displacing the heated air through the main supply air duct 130 to the building forced air distribution system.

Subsequent to the air passing through main supply air duct 130 reaching the set point temperature of duct thermostat 62, the contact 64 opens and the control signal from heat pump comfort controller 12 through leads 14 and 114 is interrupted. At that point, the supplemental heating units would be de-energized and only the heat produced by the compressor's operation would be utilized to complete the heating demand called for by the indoor thermostat 108.

Under circumstances where the differential between the indoor thermostat set point and the actual room ambient temperature is sufficiently great so as to require the addition of supplemental heat, such is not affected by the opening of duct thermostat 62. Where the indoor thermostat 108 calls for supplemental heat, a control signal is supplied to lead 124 to the supplemental heating unit control signal input terminal $W_2$ of the indoor unit 110, and is therefore unaffected by the opening of duct thermostat 62. Similarly, when the emergency heating mode (supplemental heating unit operation only) is selected, a control signal is supplied through lead 124 to indoor unit 110. Thus, the emergency heating mode is not affected by duct thermostat 62. When the heat pump outdoor unit 112 initiates a defrost cycle, that unit outputs a control signal on lead 114 for energizing the supplemental heating units 132, as the compressor is not producing heat during that cycle. Under such circumstances, the supplemental heating units will be cycled by the operation of duct thermostat 62. However, the impact of such cycling will be minimal, as it is recommended that the duct thermostat be set at a temperature approximating 95° F., which is sufficient to supply reasonably warm air to the building and above any set point temperature to which the thermostat 108 is likely to be set.

Referring now to FIG. 2, there is shown a schematic diagram of the heat pump comfort controller 12. Heat pump comfort controller 12 includes a thermostat 50 for sensing the outdoor ambient air. Thermostat 50 includes a normally closed contact 52, providing an electrical connection between the thermostat terminals 56 and 54, that opens on a rise in temperature above a predetermined set point. Thermostat 50 includes a thermal sensor 58 that is exposed to the outdoor ambient air, and may be integrated into the thermostat housing, where the thermostat 50 is to be located itself outdoors. Thermostat 50 may have a fixed set point which is factory set, or provide an adjustment for the user to select a desired set point temperature.

Where thermostat 50 is an adjustable thermostat, such should have an adjustment span of at least a range of 0°–60° F. and preferably having a selected set point within the range of 30°–40° F., with a recommended temperature setting being 35° F. With the set point temperature being set at 35° F., heat pump comfort controller 12 will output a control signal for energization of the supplemental heating unit 132 whenever the outdoor ambient air temperature is below the 35° F. set point temperature. Through the use of thermostat 50, the supplemental heat added on initial compressor operation is initiated only when it is most needed, at an outdoor ambient temperature where the heat pump system 100 begins to lose efficiency and the longer time period required for heating the air delivered from main supply air duct 130 is more noticeable to the user.

To prevent heat pump comfort controller 12 from calling for the energization of supplemental heat when the heat pump compressor is not operating or not operating in a heating mode, heat pump comfort controller 12 includes a lock out device in the form of relay 22. Relay 22 monitors the control signal for the reversing valve located in the outdoor unit 112, and prevents the output of a control signal on lead 14 when the reversing valve control signal indicates that the system is not in a heating mode. The locking out of the control signal or lead 14 occurs even when the thermostat contact 52 is closed, as when the outdoor ambient temperature being below 35° F. (or other set point value).

Relay 22 includes a coil 24 which is coupled by leads 26 and 28 to terminals 32 and 30 of controller 12. Terminal 32 is coupled to the common lead of the low voltage power supply, through lead 20, while terminal 30 is coupled to lead 18 which in turn is coupled to the reversing valve control signal lead 118. Thus, when the heat pump system is supplying a reversing valve energization control signal, coil 24 is energized to thereby open the normally closed contact 38 and close the normally open contact 46. When heat pump system 100 is not outputting a reversing valve energization signal, coil 24 is not energized and the normally open contact 46 is in an open condition and the normally closed contact 38 provides continuity therethrough.

The low voltage source lead 16 is coupled to the terminal 34 of controller 12, and a lead segment 42 connects the terminal 34 with the terminal 40 of the normally closed contact 38, or alternately, the terminal 44 of the normally open contact 46. The second contact portion of both the normally closed contact 38 and the normally open contact 46 are coupled in parallel relationship to the lead 48. Lead 48 is coupled to the terminal 54 of thermostat 50, wherein the voltage supplied from lead 16 is coupled through one of the contacts 38 or 46 to the lead 48 and through the thermostat contact 52 to the thermostat terminal 56, and then coupled by a lead 60 to the supplemental heat output control signal terminal 36 to the lead 14.

Relay 22 provides both a normally closed contact 38 and a normally open contact 46 to allow the installer to adapt controller 12 for operation with any heat pump system, irrespective of the control logic utilized for the reversing valve. Thus, if a particular heat pump system 100 energizes the reversing valve in the cooling mode, the lead segment 42 of relay 22 is coupled to the terminal 40 to conduct the low voltage supply of voltage through the normally closed contact 38 when coil 24 is not energized. For heat pump systems which energize the reversing valve in a heating mode, the lead segment 42 would be coupled to the terminal 44 for conducting the low voltage supply through the normally open contact 46 which closes when coil 24 is energized. Under either logic system, the voltage path from terminal 34 to terminal 54 is opened when the outdoor unit of the heat pump system begins a defrost cycle and the status of the reversing valve changes (either from energized to de-energized or from de-energized to energized).

It can there be seen that system 10 provides the ability to energize the supplemental heating units of an existing heat pump system 100 simultaneous with the operation of the heat pump compressor for adding additional heat to the air initially delivered by the heat pump system's air handler 134. System 10 senses the outdoor ambient temperature and where such is below a predetermined set point value, such as 35° F., a control signal is output on a lead 14 which is interconnected to the existing supplemental heat control signal lead 114 of heat pump system 100. In this manner, supplemental heat is only added when the outdoor ambient temperature is at a value which affects the efficiency of heat pump system 100. It is the operation of heat pump systems during such periods of reduced efficiency that bring the most complaints from consumers, and such is obviated by adding the supplemental heat during the initial operation period of the compressor, a time period where the diminished heating capacity of the system is most prominent.

The supplemental heat which is energized responsive to the outdoor ambient temperature being below a predetermined value, is maintained until the main supply air duct temperature reaches a predetermined value. At that time, the supplemental heat called for by the heat pump comfort controller 12 of system 10 is disabled by the duct thermostat 62. Where heat pump system 100 includes multiple stages of supplemental heating units, the output lead 14 of heat pump comfort controller 12 may be connected to a single stage of supplemental heating while the heat pump outdoor unit 112 and indoor thermostat 108 are coupled to the multiple stages of supplemental heating units, by control signal leads not shown, in order to provide a staged sequence of supplemental heat and the economies associated therewith.

Utilization of a single stage of multiple stages of supplemental heating for control by system 10 also provides economical advantages in the use of a lower kilowatt heating load to supplement the heating capacity of the compressor under low temperature outdoor ambient conditions. With the heat pump comfort controller 12 being utilized to energize a single stage of supplemental heating units of a plurality of stages, the remaining stages may be controlled emergency heating mode or second stage of heat called for by indoor thermostat 108.

As previously discussed, system 10 is easily added to an existing heat pump system 100 by installation of the controller 12 at an outdoor location in proximity to the heat pump outdoor unit 112 or indoors with the temperature sensor 58 located to sense outdoor ambient temperature. Each of the control signal leads 14, 16, 18 and 20 of controller 12 are connected in parallel with the plurality of control signal leads 114, 116, 118 and 120 which connect the indoor unit 110 to the outdoor unit 112. No additional wiring is required to be added between the indoor and the outdoor units 110, 112 of the existing heat pump system 100. The leads 14, 16, 18 and 20 can be easily connected directly to the terminals provided at the outdoor unit 112 for connection of leads 114, 116, 118 and 120, making the installation very simple. An outdoor location for controller 12, allows the thermostat 50 thereof to easily sense the outdoor ambient air temperature. The only other device to be installed, is the duct thermostat 62 which is either secured directly to the main supply air duct 30, or the temperature sensor 70 thereof coupled to the main supply air duct 130 with the thermostat housing being located in relative close proximity thereto. The lead 114 may then be cut with two portions thereof 114a and 114b coupled to the respective thermostat terminals 68 and 66, or alternately, the lead 114 removed from the connection terminal of the indoor unit 110 and installed on one of the terminals 66, 68 of thermostat 62 and a new lead coupled between the other of terminals 68, 66 and the supplemental heating unit terminal $W_2$ of indoor unit 110. All that is then necessary is the setting of thermostats 50 and 62 to the desired set point temperatures.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A system for increasing the temperature of air initially delivered by a heat pump system in a heating mode, comprising:

a heat pump including an outdoor unit, an indoor unit and a control thermostat, the heat pump further including a plurality of first control signal leads interconnecting the indoor unit, the control thermostat and the outdoor unit, the indoor unit having a supplemental heating stage;

a second thermostat located in a position for sensing a temperature of a supply air duct extending from the indoor unit of the heat pump, said second thermostat having a normally closed contact coupled between a pair of terminals and opened at a first predetermined temperature, said terminals being coupled in series relationship with a supplemental heating stage control signal lead of the plurality of first control signal leads coupled between the indoor unit and the outdoor unit, the supplemental heating stage control signal lead being coupled to the supplemental heating stage for energization thereof; and, a control assembly having a plurality of second control signal leads coupled respectively in parallel relation with the plurality of first control signal leads for output of an energization signal to the resistance heating stage control signal lead to cause the supplemental heating stage to add heat to the supply air duct until a temperature in the supply air duct exceeds said first predetermined temperature wherein said contact of said second thermostat opens.

2. The system as recited in claim 1 where said control assembly includes a third thermostat located in a position for sensing an outdoor ambient temperature, said third thermostat having a normally closed contact coupled in series with said output of said energization signal, said normally closed contact of said third thermostat being open above a second predetermined temperature.

3. The system as recited in claim 2 where said third thermostat includes means for setting said second predetermined temperature.

4. The system as recited in claim 3 where said means for setting said second predetermined temperature is settable from 0 to 60 degrees F.

5. The system as recited in claim 1 where said second thermostat includes means for setting said first predetermined temperature.

6. The system as recited in claim 5 where said means for setting said first predetermined temperature is settable from 60 to 160 degrees F.

7. The system as recited in claim 1 where said control assembly includes means for monitoring a control signal controlling a reversing valve of the heat pump system for preventing output of said energization signal responsive to the heat pump being operated in either a cooling mode or a defrost mode.

8. The system as recited in claim 7 where said means for monitoring a control signal controlling the reversing valve of the heat pump system includes a relay having a normally open contact and a normally closed contact, one of said normally open contact or said normally closed contact being selectively coupled to the supplemental heating stage control signal lead for said output of said energization signal.

9. The system as recited in claim 1 where said second thermostat is mounted to an external surface of the supply air duct at a position at least 2 feet from the indoor unit.

10. A system for modifying the operation of a heat pump system operating in a heating mode to initiate operation of a supplemental heating stage responsive to a sensed outdoor ambient temperature, said operation modification system comprising:

a duct thermostat located in a position for sensing a temperature of a supply air duct extending from an indoor unit of the heat pump system, said duct thermostat having a normally closed contact coupled between a pair of terminals and opened when said sensed supply duct temperature rises above a first predetermined temperature, said terminals being coupled in series relationship with a supplemental heating stage control signal lead of a plurality of first control signal leads coupled between the indoor unit and an outdoor unit of the heat pump system; and, a control assembly having a plurality of second control signal leads coupled respectively in parallel relation with the plurality of first control signal leads for output of an energization signal to the supplemental heating stage control signal lead to cause the supplemental heating stage to add heat to the supply air duct until a temperature in the supply air duct exceeds said first predetermined temperature wherein said contact of said duct thermostat opens, said control assembly includes an ambient sensing thermostat located in a position for sensing an outdoor ambient temperature, said ambient sensing thermostat having a normally closed contact coupled in series with said output of said energization signal, said normally closed contact of said ambient sensing thermostat being open above a second predetermined temperature.

11. The system as recited in claim 10 where said ambient sensing thermostat includes means for setting said second predetermined temperature.

12. The system as recited in claim 11 where said means for setting said second predetermined temperature is settable from 0 to 60 degrees F.

13. The system as recited in claim 10 where said duct thermostat includes means for setting said first predetermined temperature.

14. The system as recited in claim 13 where said means for setting said first predetermined temperature is settable from 60 to 160 degrees F.

15. The system as recited in claim 10 where said control assembly includes means for monitoring a control signal controlling a reversing valve of the heat pump system for preventing output of said energization signal responsive to the heat pump system being operated in either a cooling mode or a defrost mode.

16. The system as recited in claim 15 where said means for monitoring a control signal controlling the reversing valve of the heat pump system includes a relay having a normally open contact and a normally closed contact, one of said normally open contact or said normally closed contact being selectively coupled to the supplemental heating stage control signal lead for said output of said energization signal.

17. A method of modifying an existing heat pump system for increasing the temperature of air initially delivered thereby in a heating mode, comprising the steps of:

a. providing a thermostat for sensing a temperature of a supply air duct extending from an indoor unit of the heat pump system, said thermostat having a normally closed contact coupled in series with a pair of terminals that opens responsive to a sensed temperature rising above a first predetermined temperature;

b. cutting a supplemental heating stage control signal lead of the heat pump system at a location between an outdoor unit and an indoor unit of the heat pump system and coupling each cut end of the supplemental heating stage control signal lead to a respective one of said pair of terminals;

c. providing a control assembly having a plurality of control signal leads, said control assembly including means for monitoring a reversing valve control signal and outputting a control signal for energizing a supplemental heating stage of the heat pump system, said control assembly including a thermostat for sensing an outdoor ambient air temperature and having a contact coupled in series with said control signal for energizing a supplemental heating stage;

d. connecting each of said plurality of control signal leads of said control assembly of a corresponding control signal lead of the heat pump system in parallel relation, said means for monitoring a reversing valve control signal outputting said supplemental heating stage energizing control signal responsive to said thermostat of said control assembly sensing the ambient air temperature below a second predetermined temperature and the heat pump system operating in a heating mode.

18. The method of claim 17 where the step of providing a thermostat for sensing a temperature of a supply air duct includes the step of adjusting said supply air duct temperature sensing thermostat to open said normally closed contact thereof at a temperature within the range of 60 to 160 degrees F.

19. The method of claim 17 where the step of providing a control assembly includes the step of the step of adjusting said ambient air temperature sensing thermostat to open said contact thereof at a temperature within the range of 0 to 60 degrees F.

20. The method of claim 17 where the step of providing a control assembly the step of providing means for preventing output of said control signal for energizing a supplemental heating stage responsive to the outdoor unit being in a defrost mode.

* * * * *